United States Patent
Lei et al.

(10) Patent No.: US 9,819,459 B2
(45) Date of Patent: Nov. 14, 2017

(54) CHANNEL SENSING ENHANCEMENT

(71) Applicant: Microsoft Technology Licensing, LLC, Redmond, WA (US)

(72) Inventors: Haipeng Lei, Beijing (CN); Kodo Shu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 208 days.

(21) Appl. No.: 14/594,914

(22) Filed: Jan. 12, 2015

(65) Prior Publication Data
US 2016/0183249 A1    Jun. 23, 2016

(51) Int. Cl.
H04L 5/00 (2006.01)
H04W 52/02 (2009.01)
H04W 74/08 (2009.01)
H04W 16/14 (2009.01)

(52) U.S. Cl.
CPC .......... *H04L 5/001* (2013.01); *H04W 52/0209* (2013.01); *H04W 74/0816* (2013.01); *H04W 16/14* (2013.01); *Y02B 60/50* (2013.01)

(58) Field of Classification Search
CPC .......... H04W 72/0406; H04W 72/0446; H04W 52/0209; H04W 74/0816; H04W 16/14; H04L 5/00; Y02B 60/50
See application file for complete search history.

(56) References Cited

U.S. PATENT DOCUMENTS

| | | | |
|---|---|---|---|
| 8,280,389 B1 | 10/2012 | Turtinen et al. | |
| 8,374,212 B2 | 2/2013 | Charbit et al. | |
| 8,687,516 B2 | 4/2014 | Zhang et al. | |
| 8,792,900 B2 | 7/2014 | Chen et al. | |
| 8,804,536 B2 | 8/2014 | Barbieri et al. | |
| 8,818,283 B2 | 8/2014 | McHenry et al. | |
| 8,824,298 B2 | 9/2014 | Gupta et al. | |
| 8,837,422 B2 | 9/2014 | Chen et al. | |

(Continued)

FOREIGN PATENT DOCUMENTS

| | | |
|---|---|---|
| GB | 2498749 A | 7/2013 |
| WO | 2013006988 A1 | 1/2013 |

(Continued)

OTHER PUBLICATIONS

Nagata, Satoshi, "3GPP LTE Enhancements and 5G", Nov. 26, 2014, Available at: http://www.ieee-icc.org/5.%20NTT%20DOCOMO%20ICCC2014.pdf.

(Continued)

*Primary Examiner* — Jenee Holland
(74) *Attorney, Agent, or Firm* — Holzer Patel Drennan

(57) ABSTRACT

The subject matter described herein relates to measurement enhancement in wireless communication. A device informs other devices about the time period during which a channel will be occupied by its transmission, if the device determines to transmit on the channel. A set of occupation time periods can be defined, and then the device can indicate one of the defined occupation time periods to other devices. Upon detection of the indication of the occupation time period, other devices get to know that the channel will be unavailable in at least the indicated time duration, and thus can avoid unnecessary channel sensing or measurement in this time duration to save power.

19 Claims, 6 Drawing Sheets

(56) References Cited

U.S. PATENT DOCUMENTS

| | | |
|---|---|---|
| 8,874,124 B2 | 10/2014 | Clegg |
| 2002/0155844 A1* | 10/2002 | Rankin .................. H04W 4/02 |
| | | 455/456.1 |
| 2004/0121770 A1* | 6/2004 | Tigerstedt ......... H04W 36/0083 |
| | | 455/436 |
| 2004/0203815 A1* | 10/2004 | Shoemake ........... H04W 72/02 |
| | | 455/450 |
| 2005/0136947 A1* | 6/2005 | Llombart-Juan ...... G01C 21/20 |
| | | 455/456.3 |
| 2006/0018298 A1* | 1/2006 | Dilipkumar Jogi ... H04W 74/08 |
| | | 370/345 |
| 2010/0195636 A1* | 8/2010 | Nakashima ........... H04W 72/12 |
| | | 370/342 |
| 2011/0170508 A1* | 7/2011 | Xue ...................... H04L 5/0055 |
| | | 370/329 |
| 2013/0195073 A1 | 8/2013 | Chen et al. |
| 2013/0315152 A1 | 11/2013 | Ratasuk et al. |
| 2013/0337821 A1 | 12/2013 | Clegg |
| 2014/0036818 A1 | 2/2014 | Koskela et al. |
| 2014/0036853 A1 | 2/2014 | Kim et al. |
| 2014/0044105 A1 | 2/2014 | Bontu et al. |
| 2014/0071931 A1 | 3/2014 | Lee et al. |
| 2014/0302865 A1 | 10/2014 | Bai et al. |
| 2014/0341017 A1 | 11/2014 | Koskela et al. |
| 2015/0063307 A1* | 3/2015 | Luo .................... H04W 36/165 |
| | | 370/331 |
| 2015/0188675 A1* | 7/2015 | Abeysekera .......... H04W 72/04 |
| | | 370/329 |
| 2015/0208441 A1* | 7/2015 | Yoo .................. H04W 74/0816 |
| | | 370/338 |

FOREIGN PATENT DOCUMENTS

| | | |
|---|---|---|
| WO | 2013131257 A1 | 9/2013 |
| WO | 2013143053 A1 | 10/2013 |
| WO | 2013155672 A1 | 10/2013 |
| WO | 2013179095 A1 | 12/2013 |
| WO | 2014070768 A1 | 5/2014 |

OTHER PUBLICATIONS

Cabric, et al, "A Cognitive Radio Approach for Usage of Virtual Unlicensed Spectrum", In Proceedings of IST Mobile and Wireless Communications Summit, Jun. 2005, 4 pages.
Badic, et al, "Advances in Carrier Aggregation and Multi-User MIMO for LTE-Advanced", In ICT Samurai, Dec. 2012, 20 pages.
"Regulatory Requirements for LAA", In Proceedings of the 3rd Generation Partnership Project (3GPP), LG Electronics, Oct. 6, 2014, 6 Pages.
"International Search Report & Written Opinion Issued in PCT Application No. PCT/US2015/067358", dated Mar. 14, 2016, 12 Pages.
"International Preliminary Report on Patentability Issued in PCT Application No. PCT/US2015/067358", dated Nov. 14, 2016, 7 Pages.

* cited by examiner

CHANNEL SENSING ENHANCEMENT

RELATED APPLICATIONS

This application claims priority to International Application No. PCT/CN2014/094505, filed on Dec. 22, 2014, and entitled "CHANNEL SENSING ENHANCEMENT." This application claims the benefit of the above-identified application, and the disclosure of the above-identified application is hereby incorporated by reference in its entirety as if set forth herein in full.

TECHNICAL FIELD

The non-limiting and example embodiments of the present disclosure generally relate to wireless communications, and specifically to a method and apparatus for channel sensing enhancement in wireless communications.

BACKGROUND

In wireless communication, the demand for high data rate keeps increasing and Long Term Evolution (LTE) developed by the third generation project partnership (3GPP) has been approved an extremely successful platform to meet such demand. The LTE system has been designed to operate in dedicated and licensed band to avoid interference with other systems and to guarantee satisfying communication performance. However, with demand for high data rate keeps increasing and at the same time available licensed frequency resources keeps shrinking, more and more cellular network operators begin to consider utilization of the unlicensed spectrum as a complimentary tool to augment their service offering.

One alternative way for utilizing an unlicensed band is called "Licensed-Assisted Access (LAA)", which means the utilization of the unlicensed band is under control from the licensed band. LTE LAA is a topic to be studied in 3GPP LTE-Advanced Rel-13 and beyond. The objective of LTE LAA is to investigate the basic aspects for the operator-controlled non-standalone deployment of LTE in unlicensed spectrum, considering uplink and downlink or downlink only transmission in the unlicensed spectrum, to further improve network throughput and provide offloading capability to meet the demand of increasing traffic volume.

Particularly, LTE LAA can use carrier aggregation (CA) to aggregate the carriers in unlicensed spectrum, i.e., using unlicensed carrier as a Supplemental Downlink or a Component Carrier. In such a scenario, a primary cell (also called PCell, primary carrier, or primary component carrier) for either a LTE frequency division duplex (FDD) or time division duplex (TDD) system can always operate in a licensed band to carry control signaling, mobility management and data, while one or more secondary cells (also called SCells, secondary carriers, or secondary component carriers herein) in unlicensed band can provide downlink (DL) and/or uplink (UL) data transmission for opportunistic capacity improvement.

SUMMARY

The unlicensed band is shared by various wireless devices and networks, rather than dedicated for specific use. Therefore, for a system operating in the unlicensed band, co-channel interferences from other wireless systems has to be addressed. To alleviate the interference problem, listen-before-talk (LBT) feature has been introduced into the systems operating in unlicensed band, and has been made mandatory in some countries/regions. Such feature has also been agreed for LTE LAA in 3GPP RAN1#78bis meeting, and then physical layer design of LTE LAA should take the LBT feature into account. Particularly, a LTE Evolved Node B (eNB) or user equipment (UE) should measure the unlicensed spectrum before it starts to use it for transmission. There are region-specific requirements for LBT. For example, in Europe the minimum channel occupation time for the unlicensed band is 1 ms and maximum channel occupation time is 10 ms, and in Japan, the maximum channel occupation time is 4 ms. So the design of LBT should consider the different requirements in different regions and strive for a unified solution.

On the other hand, due to minimum occupation time is 1 ms, a channel being occupied currently may be released in 1 ms, which means without any knowledge of current channel occupation time, an eNB has to measure the unlicensed spectrum every 1 ms, if the eNB has data to transmit and current channel is occupied by other devices. For UE having data to transmit on unlicensed spectrum, it also has to measure the channel every 1 ms. Though such a channel sensing solution can detect available resources in time, it leads to excessive battery consumption at the UE side or energy waste at the eNB side.

In accordance with embodiments of the subject matter described herein, the problem can be alleviated by allowing a device to inform other devices about the time period during which a channel will be occupied by its transmission, if the device determines to transmit on the channel. A set of occupation time periods can be defined such that the device can indicate one of the defined occupation time periods to other devices. Upon detection of the indication of the occupation time period, other devices can determine that the channel will be unavailable at least in the indicated time duration, and turn off the channel sensing or measurement in this time duration to save power. Compared with measuring the unlicensed band every 1 ms to acquire availability of the unlicensed band, the proposed solution is more power efficient.

This Summary is provided to introduce a selection of concepts in a simplified form. The concepts are further described below in the Detailed Description. This Summary is not intended to identify key features or essential features of the claimed subject matters, nor is it intended to be used to limit the scope of the claimed subject matters.

BRIEF DESCRIPTION OF THE DRAWINGS

Embodiments of the subject matter described herein are illustrated by way of example and not limited in the accompanying figures in which like reference numerals indicate similar elements and in which.

DETAILED DESCRIPTION

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

As used herein, the term "base station" (BS) may represent a node B (NodeB or NB), an evolved NodeB (eNodeB or eNB), a Remote Radio Unit (RRU), a radio header (RH), a remote radio head (RRH), a relay, a low power node such as a femto, a pico, and so forth.

As used herein, the term "user equipment" (UE) refers to any device that is capable of communicating with the BS. By way of example, the UE may include a terminal, a Mobile Terminal (MT), a Subscriber Station (SS), a Portable Subscriber Station (PSS), a Mobile Station (MS), or an Access Terminal (AT). Specifically, some examples of UEs include devices operable in unlicensed band.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
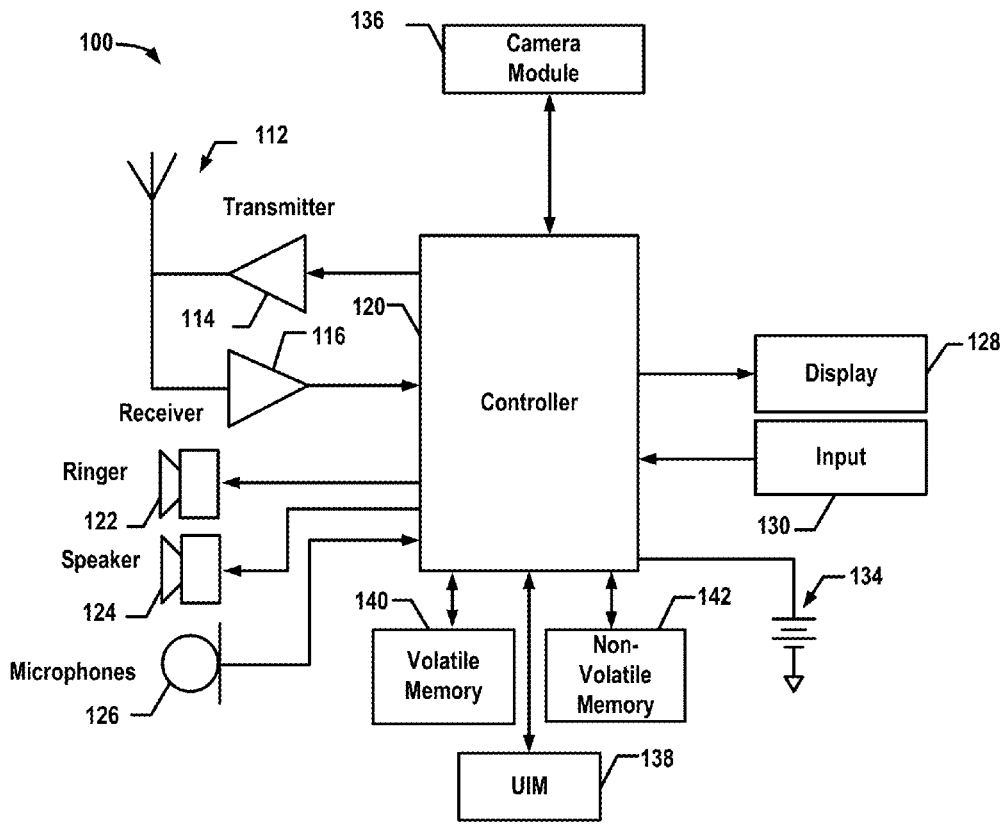
FIG. 1 illustrates a block diagram of user equipment in accordance with one embodiment of the subject matter described herein.

FIG. 1 illustrates a block diagram of a UE 100 in accordance with one embodiment of the subject matter described herein. In one embodiment, the UE 100 may be any device with wireless communication capability, such as a mobile phone, a portable digital assistant (PDA), a pager, a mobile computer, a mobile TV, a game apparatus, a laptop, a tablet computer, a camera, a video camera, a GPS device, and other types of voice and textual communication system. A fixed-type device may likewise easily use embodiments of the subject matter described herein.

As shown, the UE 100 comprises one or more antennas 112 operable to communicate with the transmitter 114 and the receiver 116. With these devices, the UE 100 may perform cellular communications with one or more BSs. Specifically, the UE 100 may be configured to operate in a licensed band or an unlicensed band, and may be configured to perform LBT when operating in an unlicensed band, for example, for contention based access.

The UE 100 further comprises at least one controller 120. It should be understood that the controller 120 comprises circuits or logic required to implement the functions of the user terminal 100. For example, the controller 120 may comprise a digital signal processor, a microprocessor, an A/D converter, a D/A converter, and/or any other suitable circuits. The control and signal processing functions of the UE 100 are allocated in accordance with respective capabilities of these devices.

Optionally, the UE 100 may further comprise a user interface, which, for example, may comprise a ringer 122, a speaker 124, a microphone 126, a display 128, and an input interface 130, and all of the above devices are coupled to the controller 120. The UE 100 may further comprise a camera module 136 for capturing static and/or dynamic images.

The UE 100 may further comprise a battery 134, such as a vibrating battery set, for supplying power to various circuits required for operating the user terminal 100 and alternatively providing mechanical vibration as detectable output. In one embodiment, the UE 100 may further comprise a user identification module (UIM) 138. The UIM 138 is usually a memory device with a processor built in. The UIM 138 may for example comprise a subscriber identification module (SIM), a universal integrated circuit card (UICC), a universal user identification module (USIM), or a removable user identification module (R-UIM), etc. The UIM 138 may comprise a card connection detecting apparatus according to embodiments of the subject matter described herein.

The UE 100 further comprises a memory. For example, the UE 100 may comprise a volatile memory 140, for example, comprising a volatile random access memory (RAM) in a cache area for temporarily storing data. The UE 100 may further comprise other non-volatile memory 142 which may be embedded and/or movable. The non-volatile memory 142 may additionally or alternatively include for example, EEPROM and flash memory, etc. The memory 140 may store any item in the plurality of information segments and data used by the UE 100 so as to implement the functions of the UE 100. For example, the memory may contain machine-executable instructions which, when executed, cause the controller 120 to implement the method described below.

It should be understood that the structural block diagram in FIG. 1 is shown only for illustration purpose, without suggesting any limitations on the scope of the subject matter described herein. In some cases, some devices may be added or reduced as required.

Figure 2:
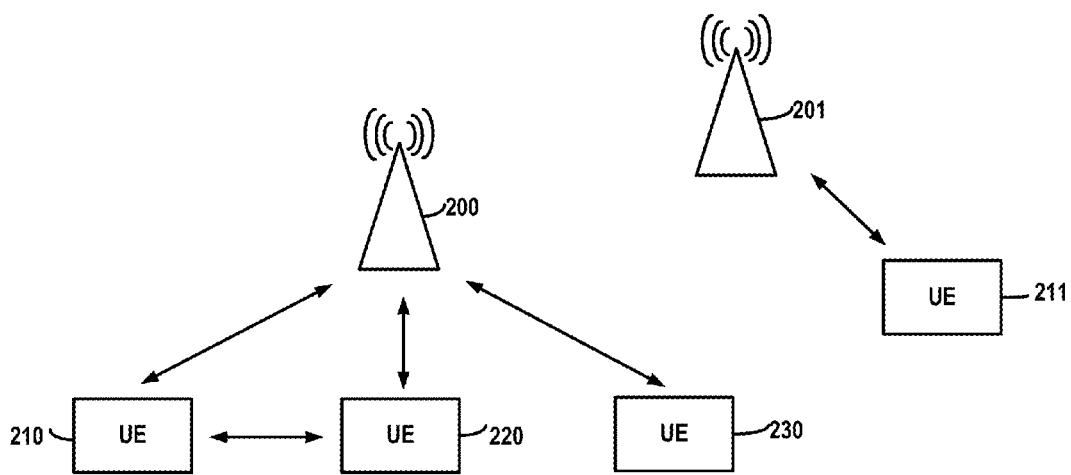
FIG. 2 illustrates a block diagram of an environment in which embodiments of the subject matter described herein may be implemented.

FIG. 2 shows an environment of a wireless communication system in which embodiments of the subject matter described herein may be implemented. As shown, one or more UEs may communicate with a BS 200. In this example, there are three UEs 210, 220 and 230. This is only for the purpose of illustration without suggesting limitations on the number of UEs. There may be any suitable number of UEs in communication with the BS 200. In one embodiment, one or more of the UEs 210, 220 and 230 may be implemented by the UE 100 as shown in FIG. 1, for example. There can be another BS 201 serving one or more other UEs, for example UE 211, in this example. In addition, one UE (UE 210, in this example) may communicate with another UE (UE 220, in this example) directly, e.g., via device-to-device (D2D) communication.

The communications between the UEs 210, 220 and 230 and the BS 200, and between the UE 211 an the BS 201 may be performed according to any appropriate communication protocols including, but not limited to, the first generation (1G), the second generation (2G), 2.5G, 2.75G, the third generation (3G), the fourth generation (4G) communication protocols, and/or any other protocols either currently known or to be developed in the future. Though for illustration purpose, in some embodiment of the disclosure, the UEs 210, 220 and 230 and the BS 200 may communicate using 3GPP LTE technique, the embodiments of the present disclosure are not limited to such network scenarios.

As the coverage of the BS 200 and BS 201 may overlap, transmission from the BS 201 may cause interference to the other UEs served by BS 200. Additionally, the D2D communication between the UE 210 and the UE 220 may also interfere the neighboring UEs and/or BSs.

Conventionally, for a wireless communication system, for example, a cellular system operating in a licensed band, the interference problem mentioned above is handled by adopting a frequency reuse factor to avoid using same frequency in adjacent cells. However, for a wireless communication system (for example a LTE system) deployed in an unlicensed band, it has to share the band with various other wireless systems (for example a Wi-Fi system) in a contention-based way, and the feature of LBT is mandatory.

As introduced above, there are region-specific requirements for LBT. For example, in Europe the minimum channel occupation time period for the unlicensed band is 1 ms and the maximum channel occupation time period is 10 ms, and in Japan, the maximum channel occupation time period is 4 ms. Considering the minimum occupation time period of 1 ms as an example, a channel being occupied currently may be released in 1 ms. As a result, if the BS has data to transmit and current channel is occupied by other devices (e.g., another BS), the BS has to measure the unlicensed spectrum every 1 ms to avoid miss-detection of an available channel. Likewise, such channel sensing mechanism has to be adopted by the UEs having data to transmit on the unlicensed spectrum, for example, for D2D communication. Such a channel sensing solution leads to excessive battery consumption at the UE side or energy waste at the BS side.

According to embodiments of the subject matter described herein, methods and apparatus are provided to enable more efficient channel sending by avoiding unnecessary measurement.

Figure 3A:
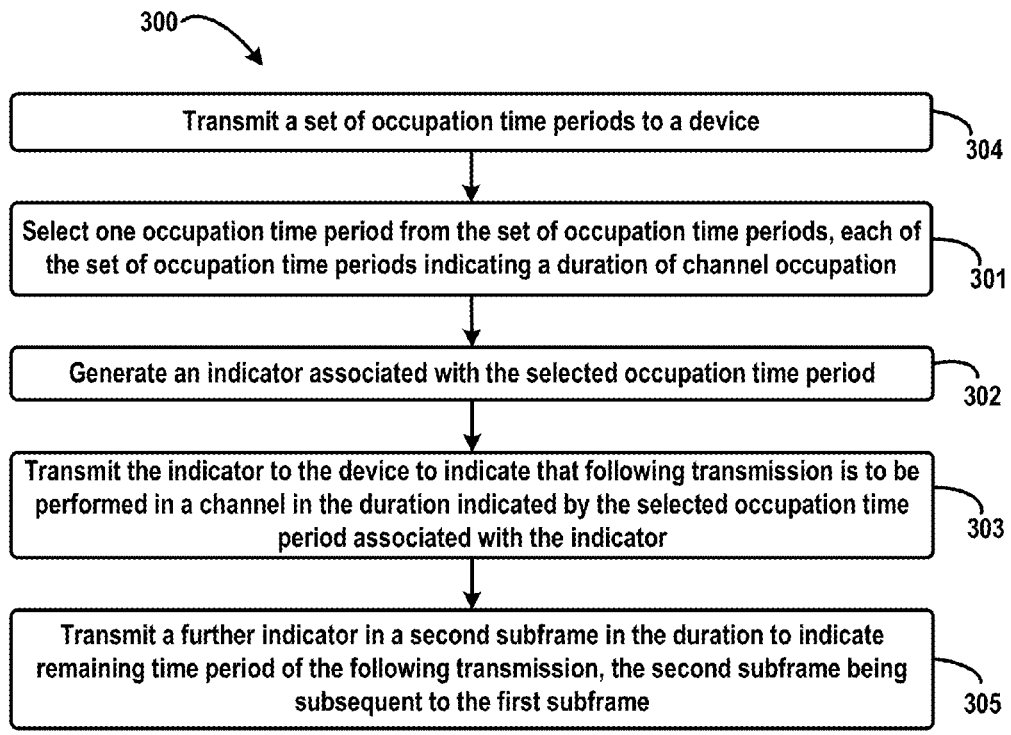
FIG. 3a illustrates a flowchart of a method for measurement enhancement in accordance with one embodiment of the subject matter described herein.

Reference is now made to FIG. 3a which illustrates a flowchart of an exemplary method 300 for measurement enhancement in a wireless network in accordance with one embodiment of the subject matter described herein. It would be appreciated that the method 300 may be implemented by, e.g., the BS 200 as shown in FIG. 2.

As shown, the method 300 is entered at step 301, where the BS 200 selects one occupation time period from a set of occupation time periods. Each of the set of occupation time periods indicates a duration of channel occupation. Then at step 302, the BS 200 generates an indicator associated with the selected occupation time period. The method 300 proceeds to step 303, where the BS 200 transmits the indicator to a device to indicate that following transmission is to be performed in a channel in the duration indicated by the selected occupation time period associated with the indicator.

In one embodiment, at step 301, the BS 200 can define the set of possible occupation time periods based on a current geographical region where the BS operates. As introduced above, the allowed occupation time period for an unlicensed band can be region-specific. For example, in Europe, an occupation time period no longer than 10 ms is acceptable, while in Japan, a device can only occupy the unlicensed band up to 4 ms for each continuous transmission. Thus, for a BS operating in Japan, it has to define a set of occupation time periods with the maximum occupation time period no larger than 4 ms then select an occupation time period within the set; while for a BS operating in Europe, it may define a set of occupation time periods with the maximum occupation time period no larger than 10 ms then select an occupation time period within the set. Alternatively or additionally, at step 301, a device having data to transmit may choose the occupation time period based on the volume of data to be carried in the following transmission. Specifically, in one embodiment, the device having data to transmit may choose the occupation time period from a set of occupation time periods based on both the volume of data to be carried in the following transmission and the region regulation.

In one embodiment, the set of occupation time periods, from which the device (e.g., the BS 200) select one occupation time period, can be predefined. For example, it can be specified in the standard or specification. In practice, different sets of occupation time periods can be defined for different regions. For example, there can be a set of occupation time periods defined for Europe as shown in Table 1, and another set of occupation time periods defined for Japan as shown in Table 2.

TABLE 1

Example of a set of occupation time period

| Index | Occupation time period for Europe |
|---|---|
| 1 | 1 ms |
| 2 | 4 ms |
| 3 | 7 ms |
| 4 | 10 ms |

TABLE 2

Another example of a set of occupation time period

| Index | Occupation time period for Japan |
|---|---|
| 1 | 1 ms |
| 2 | 2 ms |
| 3 | 3 ms |
| 4 | 4 ms |

It is to be understood that the listed time periods in each table are just for the purpose of illustration, without suggesting any limitations as to the scope of the subject matter described herein. In other embodiments, different resolutions/granularities of occupation time and/or different values and/or different number of values can be used as long as the maximum occupation time period meets the regulation requirements of a specific region. For example, for Europe, a table with 8 occupation time periods may be defined, e.g., candidate occupation time period can be one of {1 ms, 2 ms, 4 ms, 6 ms, 7 ms, 8 ms, 9 ms, 10 ms}. The table can be defined based on data transmission characteristic and/or signaling overhead required for the indication of an occupation time period.

In order to indicate the selected occupation time period, the indicator composed of multiple bits can be used. Still with reference to the example shown in Table, 1, in order to indicate one occupation time period selected from Table 1, a 2-bit indicator may be used. As another example, a 3-bit indicator may be used to indicate one occupation time period selected from 8 values. In another embodiment, different sets of occupation time period can be defined for different regions with different resolution of occupation time periods. For example, Table 1 can be used in Europe with granularity of 3 ms while Table 2 can be used in Japan with granularity of 1 ms.

In one embodiment, the set of occupation time periods as described above can be signaled to devices. As shown in FIG. 3a, the set of occupation time periods can be signaled at optional step 304. Alternatively, in one embodiment, the set of occupation time period values can be configured via radio resource control (RRC) signaling, or by system information at step 304. The BS can transmit the signaling to the UEs located in its coverage. In another embodiment, one or more sets of occupation time periods can be predefined, and the BS may just signal a set index, subset index, or region index to the UEs at step 304 rather than the set of occupation time periods per se, thereby configuring a set of occupation times period. Similarly, RRC signaling or system information may be used for this purpose.

Figure 3B:
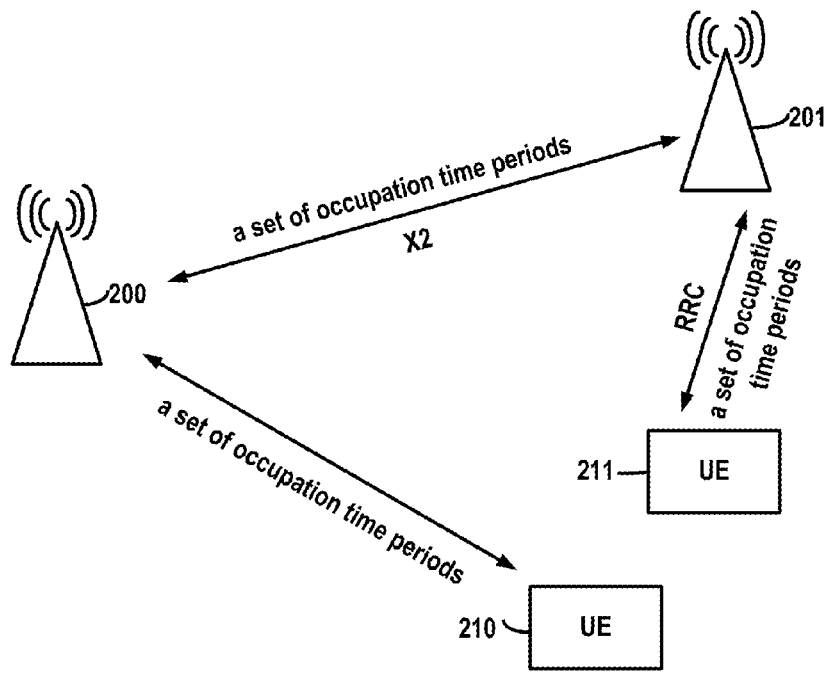
FIG. 3b illustrates a schematic diagram of transmission of the set of occupation time periods.

It is to be understood that the RRC signaling or the system information is listed just for illustration purpose, and in other embodiments, the set of occupation time periods can be transmitted via any suitable signaling at step 304. For example, in one embodiment, the set of occupation time period values can be communicated via a backhaul signaling (for example, X2 signaling) between base stations, for example between the BS 200 and the BS 201 at optional step 304. This enables the BS 201 to interpret properly the indicator transmitted in step 303 by the BS 200, and suspend its measurement on the channel in the indicated time period. Additionally, the BS 201 can indicate the set of occupation time period received from the BS 200 to its own served UE, e.g., UE 211, via RRC signaling or system information block (SIB) signaling so that the UE 211 can interpret properly the indicator transmitted in step 303 by the BS 200, and suspend its measurement on the channel in the indicated time period. Alternatively, in some embodiments, at step 304, the BS (for example the BS 200) can send both a RRC signaling to the UEs in its coverage and a X2 signaling to neighbor BSs (for example, the BS 201), such that both the UEs and the neighbor BSs/UEs can interpret the indicator transmitted in step 303 correctly and improve their channel sensing operations based on it. Furthermore, the neighbor BSs can forward the set of occupation time periods to its served UEs, for example, via RRC signaling or system information. In FIG. 3b, a schematic diagram is shown to illustrate the transmission of the set of occupation time periods.

In one embodiment, at step 302, the indicator can be generated by the BS 200 as an index of the selected occupation time period. For example, in the example shown in Table 1, the BS 200 may generate an indicator of the value "2" to indicate the occupation time period of 4 ms. It is to be understood that this is just for the purpose of illustration, without suggesting any limitations as to the scope of the subject matter described herein. In alternative embodiment, the indicator can be implemented in any other suitable forms. For example, in one embodiment, the indicator can directly indicate the length of the selected occupation time period. By way of example, the indicator can use a value of "7" to indicate a selected occupation time period of 7 ms.

In one embodiment, at step 303, the BS 200 can transmit the indicator via a layer 1 (L1) signaling, i.e., physical layer signaling. In one embodiment, the indicator can be transmitted in an orthogonal frequency division multiplexing (OFDM) symbol of a first subframe in the indicated duration, wherein the following transmission starts at the first subframe. In other words, transmission of the indicator generated in step 302 and the following transmission which will occupy the channel for the occupation time period indicated by the indicator occur in same subframe.

Figure 4A:
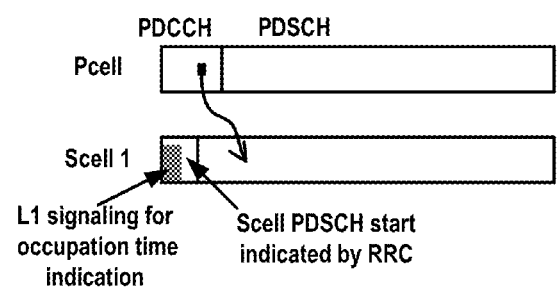
FIG. 4a illustrates a schematic diagram of transmitting an indicator of occupation time period in accordance with an embodiment of the subject matter described herein.

One example is shown in FIG. 4a. As illustrated in FIG. 4a, in this example, the data transmission in a secondary carrier (also called SCell, secondary component carrier, or secondary cell) which may locate in a unlicensed band is scheduled via physical downlink control channel (PDCCH) from a primary carrier (also called PCell, primary component carrier, or primary cell) or from a secondary carrier which may locate in a licensed band. In one embodiment, the starting position of the PDSCH transmission in the SCell in a subframe can be configured by the RRC signaling, for example. Assuming the indicator can be transmitted in the first OFDM symbol as shown in the FIG. 4a, to indicate the occupation time, then the PDSCH transmission can start at the second OFDM symbol in the subframe, i.e., immediately after the layer 1 indicator.

It is to be understood that the indicator can also be transmitted in another OFDM symbol before the PDSCH starts. Typically, one OFDM symbol may be enough for the transmission of the indicator. Of course, it is also possible to transmit the indicator in more than one OFDM symbol, for example, for the purpose of enhancing the signaling reliability or providing more information. Fixing the L1 signaling carrying the indicator only in the first OFDM symbol can leave more resource for the following PDSCH transmission. The transmission time period (e.g., 1 OFDM symbol) of the L1 signaling carrying the indicator can be used by other devices (e.g., the BS or UEs), which desire to access the channel via LBT, for channel sensing and for decoding of the L1 signaling. Since the required channel measuring time for LBT is 20 μs, one OFDM symbol lasting for about 66 μs is enough for the measurement and decoding. Upon detecting the indicator, these devices are aware that the channel will be occupied for the indicated time duration. Accordingly, these devices can suspend their measurements or channel sensing to save power.

In order to allow other devices (e.g., the BS or UEs) contending for the channel via LBT to detect the L1 signaling carrying the indicator, in one embodiment, this L1 signaling can be a common signaling without cell or UE specific scrambling or cell-specific shifting. To this end, in one embodiment, at step 303, the BS may transmit the indicator using a signaling with a physical control format indication channel (PCFICH) structure. Fixed cell ID and slot number can be set for common scrambling sequence generation, e.g., always set cell ID to 510 and slot number to 0.

As specified in the LTE specification, the PCFICH indicates the size of the control region in terms of the number of OFDM symbols. That is, the PCFICH is indicative of where the data region in current subframe starts. Correct decoding of the PCFICH information is thus essential. If the PCFICH is incorrectly decoded, the terminal will neither know how to process the control channels nor where the data region starts for current subframe. The PCFICH consists of two bits of information, corresponding to the three control-region sizes of one, two, or three OFDM symbols (or corresponding to two, three or four OFDM symbols for narrow bandwidths scenario). The 2 bits may be coded into a 32-bit codeword. The coded bits are scrambled with a scrambled with a cell-specific sequence to randomize inter-cell interference, QPSK modulated, and then mapped to 16 resource elements.

In one embodiment, it is possible to use a signaling of a structure consistent with PCFICH to carry the information about the occupation time period. That is, the structure of such signaling may have the same or similar structure with PCFICH. In this embodiment, four values can be defined and configured by RRC signaling to cover the range from 1 ms to 10 ms, for example. By way of example, the four values can be designed as shown in Table 1. The value carried by the signaling can be interpreted to be one of four configured occupation time period values.

Alternatively, in one embodiment, the indicator can be transmitted by reusing PCFICH in the SCell. In this way, the control format indicator (CFI) value may be interpreted to be one of four configured occupation time period values. This would be beneficial especially for LTE LAA. As known, in LTE LAA, the cross-carrier scheduling from licensed PCell is used to schedule SCell on unlicensed band, and the starting symbol of PDSCH on the SCell is indicated by RRC signaling IE "pdsch-Start-r10" in the field of "CrossCarrierSchedulingConfig". At this point, the PCFICH in the SCell is not necessarily used for the detection of scheduled PDSCH transmission in same subframe. Therefore, reusing PCFICH to carry the indicator of the selected occupation time period will have no impact on the SCell.

In another embodiment, the method 300 may proceeds to step 305, where the device (e.g., the BS 200) transmits a further indicator in a second subframe in the duration indicated by the indicator transmitted at step 303. The further indicator is used to indicate the remaining time period of the following transmission, where the second subframe is subsequent to the first subframe.

Figure 4B:
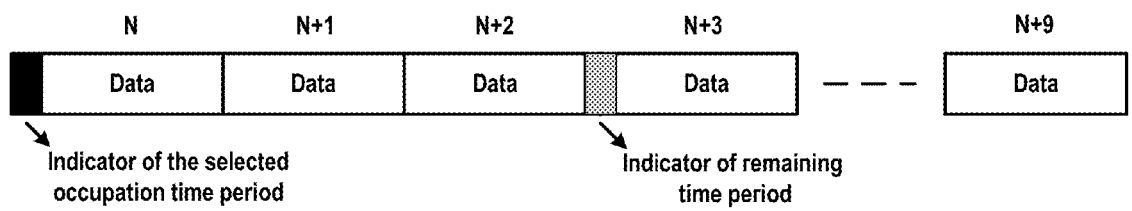
FIG. 4b illustrates a schematic diagram of transmitting an indicator of occupation time period in accordance with another embodiment of the subject matter described herein.

For example, as shown in FIG. 4b, for a PDSCH transmission lasting for 10 ms, the BS may transmit, at step 303, an indicator of "10 ms" in a subframe N where the PDSCH transmission starts. Then the BS may transmit another indicator of "7 ms" in a subframe N+3 at step 305 to inform other devices that the PDSCH transmission will complete in 7 ms. In the case that a device missed the first indicator transmitted in subframe N, it can still have an opportunity to detect the further indicator in subframe N+3 to thereby determine the remaining time duration of the following transmission. As such, unnecessary measurement or channel sensing in the duration (7 ms in this example) can be avoided. If a device starts LBT operation in subframe N+1, it may first detect every 1 ms. Then, upon detecting the indicator of "7 ms" in subframe N+3, the device may suspend its measurement or channel sensing for 7 ms to save power.

Though in some embodiments, the transmission of the indicator and the following transmission occur in a channel in a licensed band, embodiments of the subject matter described herein are not limited thereto. The method 300 may also apply to a licensed band. For example, in a scenario where a groups of UEs are configured with some shared resource in a licensed band for D2D communication, and each D2D pair is required to content for the resource via LBT, the method 300 also applies, i.e., UE involved in D2D may perform the steps described with reference to FIG. 3a to inform other UEs the potential occupation time period of a channel, if it is to transmit using the channel.

Figure 5:
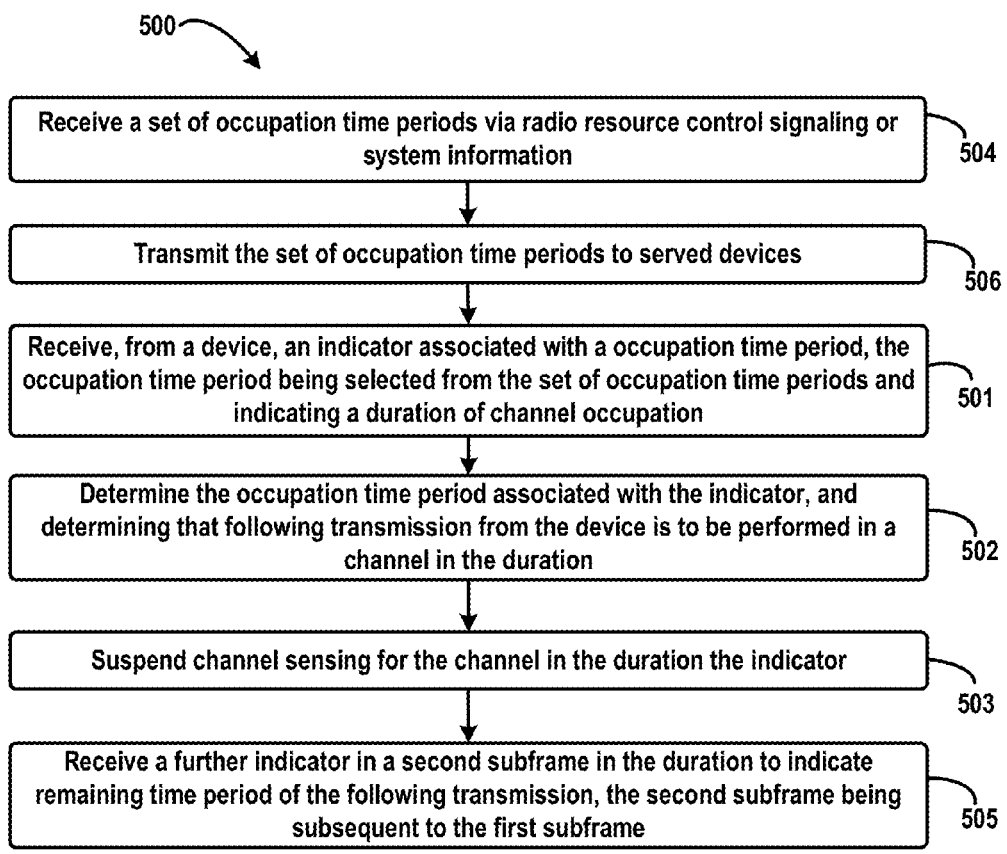
FIG. 5 illustrates a flowchart of a method for measurement enhancement in accordance with another embodiment of the subject matter described herein.

FIG. 5 illustrates a flowchart for an example method 500 of measurement enhancement in a wireless network in accordance with an embodiment of the subject matter described herein. The method 500 could be implemented, e.g., in UE such as UE 210, or in a BS such as BS 201 shown in FIG. 2. Alternatively, the method 500 may be performed by any other suitable entities in the wireless communication system. In the following description, just for simplicity, assume the method is performed by the UE 210 shown in FIG. 2.

As shown, in one embodiment, the method 500 is entered at step 501, where the UE 210 receives, from a device (e.g., a BS 200), an indicator associated with an occupation time period, the occupation time period is selected from a set of occupation time periods and indicates a duration of channel occupation. Next, at step 502, the UE 210 determines the occupation time period associated with the indicator, and determines that following transmission from the device (e.g., a BS 200) is to be performed in a channel in the duration indicated. Then, at step 503, the UE 210 suspends channel sensing for the channel in the duration to save power.

In accordance with an embodiment of the subject matter described herein, the indicator received at step 501 can be the indicator transmitted by the BS 200 at step 301 described with reference to FIG. 3a. Thus, design of the indicator described with reference to FIG. 3a also applies here and will not be detailed again. For example, the indicator can be carried by a layer 1 signaling. In this embodiment, at step 501, the UE 210 may receive the layer 1 signaling including the indicator in an OFDM symbol of a first subframe in the duration where the following transmission starts. In an embodiment of the subject matter described herein, the UE may receive the indicator in the first OFDM symbol in a subframe where the following PDSCH transmission starts, as shown in FIG. 4a.

In another embodiment, at step 501, the UE 210 receives the indicator from a signaling with a PCFICH structure which has been introduced with reference to FIG. 3a. The signaling carrying the indicator can be a new signaling with the same or similar structure as PCFICH. Alternatively, the existing PCFICH in a SCell can be reused.

In one embodiment, the indicator received at step 501 may be an index of one occupation time period of a set of occupation time periods. In this embodiment, at step 502, the UE 210 may determine the occupation time period from the set of occupation time periods based on the indicator. As described with reference to FIG. 3a, the set of occupation time periods can be predefined, such as the ones shown in Table 1 and Table 2, for example.

To conform to requirement in a specific operating region, the BS 200 may transmit the set of occupation time periods to UEs in its coverage. To this end, the UE may receive the set of occupation time periods from the BS 200 at step 504 which is prior to step 501. In one embodiment, the set of occupation time periods may be received via radio resource control (RRC) signaling or system information, for example. It can be understood that the RRC signaling and the system information are listed just for illustration purpose, in other embodiments, the set of occupation time periods can be received via any suitable signaling. For example, the method 500 can also be performed by a BS (for example, the BS 201 shown in FIG. 2), and in such an embodiment, at step 504, the BS may receive the set of occupation time periods from the BS 200 via a backhaul signaling (for example, X2 signaling), rather than the RRC signaling. In this embodiment, the method 500 may further comprise step 506, where the BS may forward the set of occupation time periods received from the BS 200 to its own served UEs, for example, via RRC signaling or system information. The operation can be similar as that of the step 304 described with reference to FIG. 3, and then details are omitted here.

As described with reference to FIG. 3a, the BS may send another indicator at step 305 to indicate remaining time period of the following transmission. Accordingly, in this embodiment, the method 500 may proceeds to optional step 505, where the UE 210 receives a further indicator in a second subframe in the duration. This further indicator indicates remaining time period of the following transmission from the device (e.g., BS 200), the second subframe being subsequent to the first subframe. A schematic diagram for such embodiments has been shown in FIG. 4b.

Though in some embodiments of the subject matter described herein, the receiving of the indicator and the following transmission from the device (e.g., BS 200) occur in a channel in an unlicensed band, embodiments of the subject matter described herein are not limited thereto. The method 500 may also apply to a licensed band. For example, in a scenario where a groups of UEs are configured with some shared resource in a licensed band for D2D communication, and each D2D pair is required to contend for the resource via LBT, the method 500 also applies, i.e., each UE involved in D2D may perform the steps described with reference to FIG. 5 to enable more efficient measurement.

Figure 6:
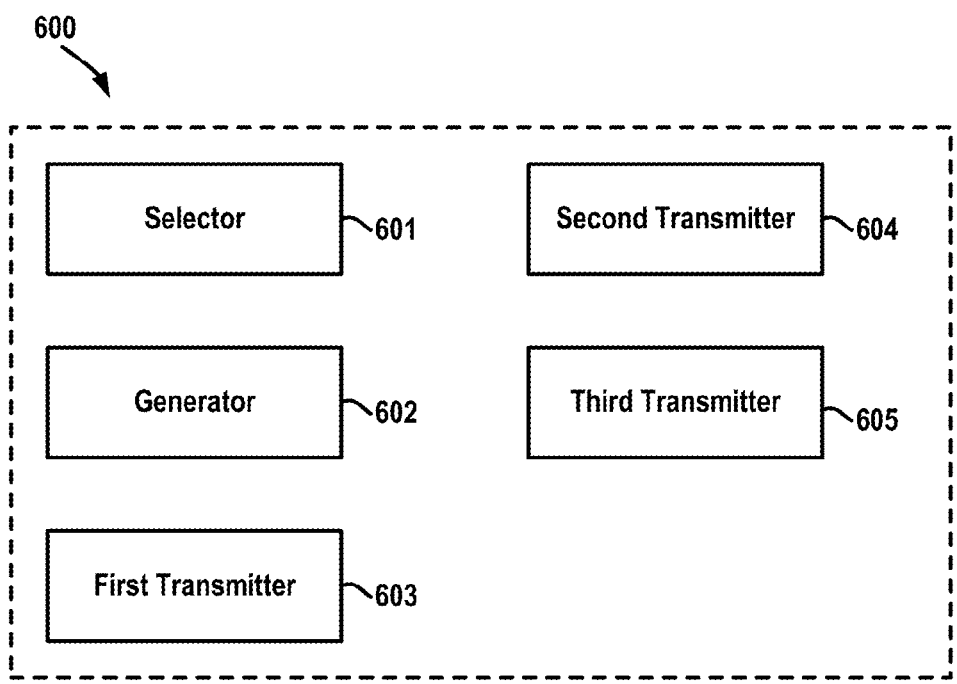
FIG. 6 illustrates a block diagram of an apparatus for measurement enhancement in accordance with one embodiment of the subject matter described herein.

FIG. 6 illustrates a block diagram of an apparatus 600 for measurement enhancement in wireless communication in accordance with one embodiment of the subject matter described herein. The apparatus 600 can be implemented as, the BS 200 shown in FIG. 2, or at least a part thereto. Alternatively or additionally, the apparatus 600 may be implemented as any other suitable entity in the wireless communication system. The apparatus 600 is operable to carry out the example method 300 described with reference to FIG. 3*a* and possibly any other processes or methods. It is also to be understood that the method 300 described with reference to FIG. 3*a* is not necessarily carried out by the apparatus 600. At least some steps of the method 300 can be performed by one or more other entities.

Generally, all the features discussed above with reference to the method 300 apply to the apparatus 600. Specifically, as shown, in one embodiment, the apparatus 600 comprises a selector 601, configured to select one occupation time period from a set of occupation time periods, each of the set of occupation time periods indicating a duration of channel occupation; a generator 602, configured to generate an indicator associated with the selected occupation time period; and a first transmitter 603, configured to transmit the indicator to a device to indicate that following transmission is to be performed in a channel in the duration indicated by the selected occupation time period associated with the indicator.

In one embodiment, the selector 601, the generator 602, and the first transmitter 603 are configured to perform the steps 301, 302 and 303 of the method 300 described with reference to FIG. 3*a*, respectively, and then the actions described with reference to the steps 301, 302 and 303 also apply to the selector 601, the generator 602, and the first transmitter 603, respectively. Therefore, details will not be repeated here. For example, in one embodiment, the selector 601 can be configured to select one occupation time period based on at least one of the following: a current geographical region, and volume of data to be carried in the following transmission. The generator 602 may be configured to generate an index associated with the selected occupation time, or generate a value indicating length of the selected occupation time period explicitly, in accordance with an embodiment. The first transmitter 603 can be configured to transmit the indicator via a layer 1 signaling in an OFDM symbol of a first subframe in the duration where the following transmission starts, in one embodiment. The first transmitter 603 may be configured to transmit the indicator using a signaling with the physical control format indication channel (PCFICH) structure, in another embodiment. The signaling can be a new signaling, or it can be the existing PCFICH in the SCell where the following data transmission occurs.

In one embodiment, the apparatus 600 may further comprise a second transmitter 604, configured to transmit the set of occupation time periods to the device. In one embodiment, the second transmitter 604 can be configured to transmit the set of occupation time periods, via radio resource control (RRC) signaling or system information, for example to UEs located in its coverage. In another embodiment, the second transmitter 604 can be configured to transmit the set of occupation time periods via a backhaul signaling for example X2 signaling, to neighbor base stations. In still another embodiment, the second transmitter 604 can be configured to transmit the set of occupation time periods both to the UEs and the neighbor BSs, via RRC signaling and X2 signaling respectively. As described with reference to FIG. 3*a*, the set of occupation time periods can also be predefined, and/or the set of occupation time periods can be region-specific. Examples of the set of occupation time period can be found in Table 1, and Table 2. The second transmitter 604 can be configured to transmit a set of values to the device, or transmit an index for a set, a subset, or a region to indicate the set of occupation time implicitly.

In one embodiment, the apparatus 600 may further comprise a third transmitter 605, configured to transmit a further indicator in a second subframe in the duration to indicate remaining time period of the following transmission, the second subframe being subsequent to the first subframe. This further indicator can enable a device which has missed the indicator transmitted in the first subframe to suspend its channel sensing or measurement in the remaining time period of the following transmission to save power.

As described above, the apparatus 600 may be used to improve measurement in both a licensed and unlicensed bands.

Figure 7:
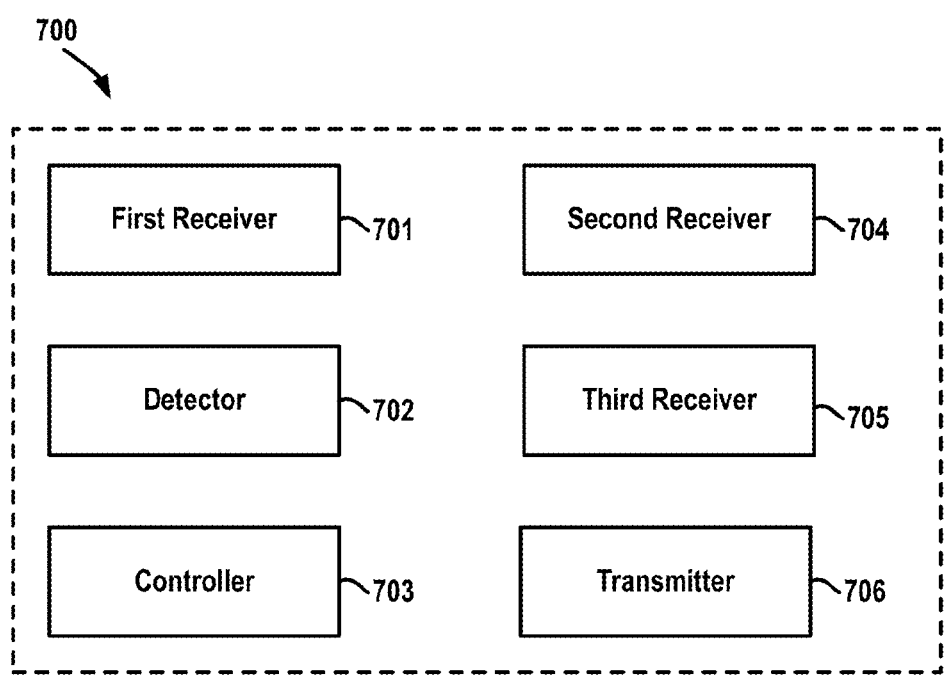
FIG. 7 illustrates a block diagram of an apparatus for measurement enhancement in accordance with another embodiment of the subject matter described herein.

Reference is now made to FIG. 7, which illustrates a block diagram of an apparatus 700 for measurement enhancement in wireless communication in accordance with an embodiment of the subject matter described herein. The apparatus 700 can be implemented as, the BS 200 or the UE 210 shown in FIG. 2, or at least a part thereto. Alternatively or additionally, the apparatus 700 may be implemented as any other suitable entity in the wireless communication system. The apparatus 700 is operable to carry out the example method 500 described with reference to FIG. 5 and possibly any other processes or methods. It is also to be understood that the method 500 described with reference to FIG. 5 is not necessarily carried out by the apparatus 700. At least some steps of the method 500 can be performed by one or more other entities.

Generally, all the features discussed above with reference to the method 500 apply to the apparatus 700. Specifically, as shown, in one embodiment the apparatus 700 comprises a first receiver 701, configured to receive, from a device, an indicator associated with a occupation time period, the occupation time period being selected from a set of occupation time periods and indicating a duration of channel occupation; a detector 702, configured to determine the occupation time period associated with the indicator and determining that following transmission from the BS is to be performed in a channel in the duration; and a controller 703, configured to suspend channel sensing for the channel in the duration.

In another embodiment, the first receiver 701 is configured to receive a layer 1 signaling including the indicator in an OFDM symbol of a first subframe in the duration, the following transmission starting at the first subframe. In still another embodiment, the first receiver 701 is configured to receive the indicator from a signaling with a physical control format indication channel (PCFICH) structure.

In some embodiments, the apparatus 700 may further comprise a second receiver 704, configured to receive the set of occupation time periods. In one embodiment, the second receiver 704 can be configured to receive the set of occupation time periods, via radio resource control (RRC) signaling or system information, for example when the apparatus is implemented as UE or a part thereof. In another embodiment, the second receiver 704 can be configured to receive the set of occupation time periods via a backhaul signaling (for example, X2 signaling), when the apparatus is implemented as a BS or a part thereof. In such an embodiment, the apparatus may further comprise a transmitter 706, configured to forward/sent the received set of occupation time periods to UEs within its coverage. The operation can be similar as that described with reference to the step 304 of the method 300 and the second transmitter 604 of the apparatus 600, and then details will be omitted here.

In one embodiment, the apparatus 700 can further comprise a third receiver 705, configured to receive a further indicator in a second subframe in the duration to indicate remaining time period of the following transmission, the second subframe being subsequent to the first subframe.

In one embodiment of the subject matter described herein, the first receiver 701, the detector 702, the controller 703, the second receiver 704, and third receiver 705 may be configured to perform the steps 501 to 505 of the method 500 described with reference to FIG. 5, respectively, and thus the actions described with reference to these steps also apply these components, respectively. Therefore, details will be omitted here.

It is to be understood that, though in some embodiments of the subject matter described herein, methods and apparatus are described in the context of a cellular system, particularly a LTE LAA system, embodiments of the subject matter described herein are not limited thereto.

The modules/units included in the apparatuses 600 and/or 700 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the apparatuses 600 and/or 700 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

In addition, some units or modules in the systems 600 and 700 can be combined in some implementations. For example, in one embodiment, it is possible to use a single transmitter to function as the transmitters in the system 600 as discussed above. Likewise, a single receiver may function as the receivers in the system 700 as discussed above.

Generally, various embodiments of the subject matter described herein may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the subject matter described herein are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the subject matter can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method of wireless communication comprising:
defining a set of occupation time periods, maximum occupation time period within the set being not larger than a maximum occupation time period in accordance with a region regulation requirements;
selecting an occupation time period from the set of occupation time periods, each of the set of occupation time periods indicating a duration of channel occupation;
generating an indicator associated with the selected occupation time period; and
transmitting the indicator to a device to indicate that following transmission is to be performed in a channel in the duration indicated by the selected occupation time period associated with the indicator.

2. The method of claim 1, wherein the selecting an occupation time period from the set of occupation time periods comprises:
selecting the occupation time period based on at least one of the following: a current geographical region, and volume of data to be carried in the following transmission.

3. The method of claim 1, wherein the transmitting the indicator comprises:
transmitting the indicator via the layer 1 signaling in an orthogonal frequency division multiplexing (OFDM) symbol of a first subframe in the duration, the following transmission starting at the first subframe.

4. The method of claim 3, further comprising:
transmitting a further indicator in a second subframe in the duration to indicate remaining time period of the following transmission, the second subframe being subsequent to the first subframe.

5. The method of claim 1, wherein the transmitting the indicator comprises:
transmitting the indicator using a signaling with a physical control format indication channel (PCFICH) structure and scrambled with a common scrambling sequence generated based on at least one of a fixed cell identity and a fixed slot number.

6. The method of claim 1, further comprising:
transmitting the set of occupation time periods to the device via radio resource control signaling or system information or backhaul signaling.

7. The method of claim 1, wherein the channel is in an unlicensed band.

8. A method of wireless communication comprising:
receiving, from a device, an indicator associated with an occupation time period, the occupation time period being selected from a set of occupation time periods and indicating a duration of channel occupation;
determining that following transmission from the device is to be performed in a channel in the duration indicated by the occupation time period associated with the received indicator;
transmitting the received indicator using a signaling with a physical control format indication channel (PCFICH) structure and scrambled with a common scrambling sequence generated based on at least one of a fixed cell identity and a fixed slot number; and
suspending channel sensing for the channel in the duration.

9. The method of claim 8, wherein the receiving an indicator comprises:
receiving a layer 1 signaling including the indicator in an orthogonal frequency division multiplexing (OFDM) symbol of a first subframe in the duration, the following transmission starting at the first subframe.

10. The method of claim 9, wherein the receiving a layer 1 signaling including an indicator comprises:
receiving the indicator from a signaling with a physical control format indication channel (PCFICH) structure.

11. The method of claim 9, further comprising:
receiving a further indicator in a second subframe in the duration to indicate remaining time period of the following transmission, the second subframe being subsequent to the first subframe.

12. The method of claim 8, further comprising:
receiving the set of occupation time periods via radio resource control signaling or system information or backhaul signaling.

13. The method of claim 8, wherein the channel is in an unlicensed band.

14. An apparatus for wireless communication comprising:
a selector configured to select an occupation time period from a set of occupation time periods at least in part based on a current geographical region, each of the set of occupation time periods indicating a duration of channel occupation;
a generator configured to generate an indicator associated with the selected occupation time period; and
a first transmitter configured to transmit the indicator to a device, via a layer 1 signaling with a physical control format indication channel (PCFICH) structure, to indicate that following transmission is to be performed in a channel in the duration indicated by the selected occupation time period associated with the indicator, wherein the first transmitter is configured to transmit the indicator by reusing the PCFICH signaling and scrambling the signaling with a common scrambling sequence generated based on at least one of a fixed cell identity and a fixed slot number.

15. The apparatus of claim 14, wherein the selector is configured to:
select the occupation time period further based on volume of data to be carried in the following transmission.

16. The apparatus of claim 14, wherein the first transmitter is configured to:
transmit the indicator via the layer 1 signaling in an orthogonal frequency division multiplexing (OFDM) symbol of a first subframe in the duration, the following transmission starting at the first subframe.

17. The apparatus of claim 16, further comprising
a third transmitter configured to transmit a further indicator in a second subframe in the duration to indicate remaining time period of the following transmission, the second subframe being subsequent to the first subframe.

18. The apparatus of claim 14, further comprising:
a second transmitter configured to transmit the set of occupation time period to the device via radio resource control signaling or system information or backhaul signaling.

19. The apparatus of claim 14, wherein the channel is in an unlicensed band.

* * * * *